(12) United States Patent
Fernando

(10) Patent No.: US 6,806,877 B2
(45) Date of Patent: Oct. 19, 2004

(54) METHOD FOR GENERATING EYE MASKS USING A PARAMETRIC REPRESENTATION

(75) Inventor: Chenjing Fernando, Windsor, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 158 days.

(21) Appl. No.: 10/023,012

(22) Filed: Dec. 18, 2001

(65) Prior Publication Data

US 2003/0112241 A1 Jun. 19, 2003

(51) Int. Cl.[7] .............................................. G06T 11/20
(52) U.S. Cl. .................... 345/440; 345/440.1; 345/441; 345/442
(58) Field of Search ............................. 345/440, 440.1, 345/441, 442

(56) References Cited

U.S. PATENT DOCUMENTS 5,774,242 A * 6/1998 O'sullivan et al. ......... 359/110

OTHER PUBLICATIONS

Michael Lauterbach, LeCroy Corporation—"Getting More Out Of Eye Diagrams"; The Practical Engineer, pp. 61–64.

* cited by examiner

Primary Examiner—Matthew C. Bella
Assistant Examiner—Tam Tran
(74) Attorney, Agent, or Firm—Juergen Krause-Polstorff

(57) ABSTRACT

Eye diagram masks may be specified by physical parameters directly related to waveform parameters in place of geometric representations, resulting in a more user friendly way to create custom eye masks. NRZ eye masks may be specified by the user using five parameters while RZ eye masks may be specified by the user using seven parameters.

20 Claims, 19 Drawing Sheets

METHOD FOR GENERATING EYE MASKS USING A PARAMETRIC REPRESENTATION

FIELD OF INVENTION

The invention relates to a tool for conducting performance analysis on optical transmission systems, and more particularly to a method for defining custom eye pattern masks for sensing signal distortions.

BACKGROUND

Eye masks consist of regions or polygons that collectively express constraints on the distortion of signal waveforms such as may occur in transmission links or on the signal waveforms generated by optical transmitters. The eye mask quickly makes several measurements in one comparison, and also gives valuable visual feedback to the success or failure of the test. Virtually every industry standard on compliance testing for optical transmitters defines a specific eye-mask.

Distortion is any inaccurate reproduction of a generated signal which is referred to system elements placed anywhere in a transmission link. Distortion can be measured by comparing the differences in wave shape between the original signal and that of the signal after it has traversed the transmission link. Optical signals can suffer degradation in transmission from noise, inter-symbol interference, fiber dispersion etc.

As data transmission rates for signals increase, the requirement for faster and more sensitive transmission systems increases. The extent of signal degradation can be viewed via an eye closure diagram which is the graphic pattern produced on a digital oscilloscope when a baseband signal is applied to the vertical input of the digital oscilloscope while the symbol rate serves to trigger the time base. For a binary signal, the eye closure diagram has a single "eye" which is open or closed to a degree determined by the amount of signal degradation. An open eye pattern is desired. Changes in the "eye" size indicate intersymbol interference, amplitude irregularities, or timing problems such as jitter, depending on the signal that is being measured.

To facilitate the use of an eye closure diagram, a reference eye pattern mask is typically established on an eye closure diagram. A reference eye pattern mask typically comprises a set of pre-defined regions such as polygons on digital oscilloscope screen or other visual display and effectively defines regions of exclusion. When the waveforms of the eye closure diagram intrude into the pre-defined region comprising a reference eye pattern mask, a mask violation occurs indicating problems with the quality of the sampled optical signal.

Standard reference patterns of eye masks for non-return to zero (NRZ) binary encoding are available in commercial measurement and testing products, while no standard reference patterns are yet available for return to zero (RZ) binary encoding. Many test scenarios require the use of custom masks, in order to create more stringent tolerances or to emphasize specific waveform characteristics (e.g. soliton characteristics). Presently, custom reference eye mask creation is only possible by having the user geometrically define the mask region by specifying the vertex coordinates for all the regions making up the reference eye mask that is used. This is a cumbersome, non-intuitive and difficult to control method for generating precise custom reference eye mask patterns.

SUMMARY OF INVENTION

In accordance with the present invention, eye mask patterns can be defined by physical parameters that relate directly to key waveform parameters including jitter, transition times and signal strength. The parametric eye mask representation conveys a physical meaning to eye mask descriptions and the eye mask creation process. Depending on the method of implementation, the parametric eye mask representation allows user friendly interactive eye mask creation using, for example, a personal computer, work station or digital oscilloscope. Parametric representations for Non-Return-to-Zero (NRZ) eye masks and for Return-to-Zero (RZ) eye masks may be created. NRZ and RZ are fundamental encoding schemes and the eye diagrams for other common coding schemes such as Manchester, AMI and CMI reduce to the NRZ type. The parameter set for NRZ eye masks is a subset of the parameter set used to describe RZ masks, as NRZ masks are symmetric with respect to the horizontal axis while RZ masks are asymmetric with respect to the horizontal axis.

DETAILED DESCRIPTION OF THE INVENTION

Figure 1:
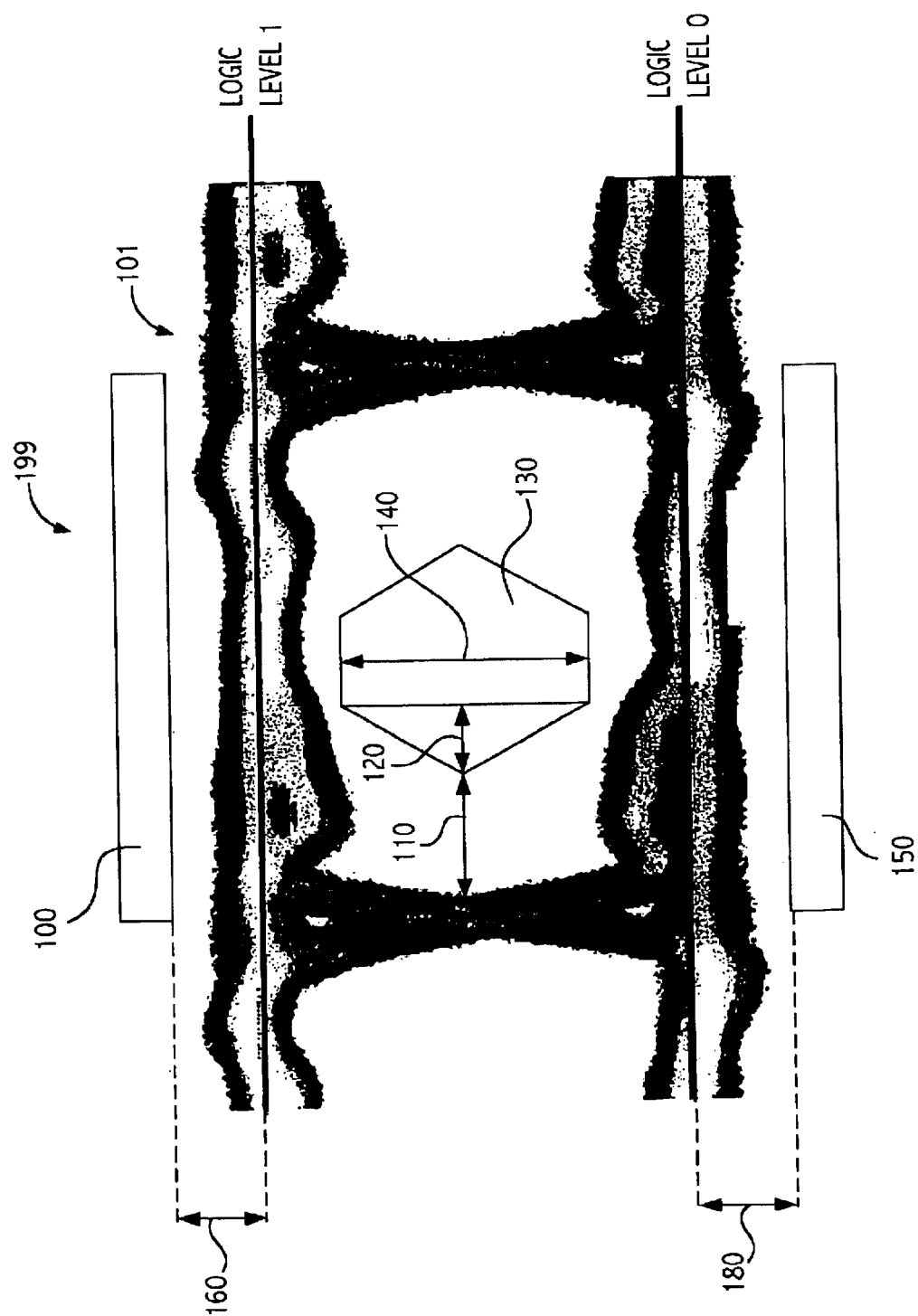
FIG. 1 shows an embodiment in accordance with the invention comprising the NRZ parameters.

The eye mask parameters are effectively the desired tolerances of the eye measurement parameters. In accordance with an embodiment of the invention, NRZ masks may be described by five parameters with respect to NRZ eye diagram 101 as shown in FIG. 1, namely jitter parameter 110, rise/fall time slope parameter 120 (assuming the rise time is equal to the fall time, otherwise an additional parameter is needed), eye-height parameter 140, overshoot parameter 160 and undershoot parameter 180. Three mask regions 100, 130 and 150 are required for the definition of the NRZ eye mask but as is readily apparent from FIG. 1, regions 100 and 150 are identical in shape and size and serve to bound overshoot and undershoot, respectively. Region 130 enforces constraints on the minimum eye opening. The values for the five mask parameters establish the boundaries for mask regions 100, 130 and 150. Note that mask regions 100, 130 and 150 need not be polygons and their depiction as polygons is merely exemplary.

Figure 2:
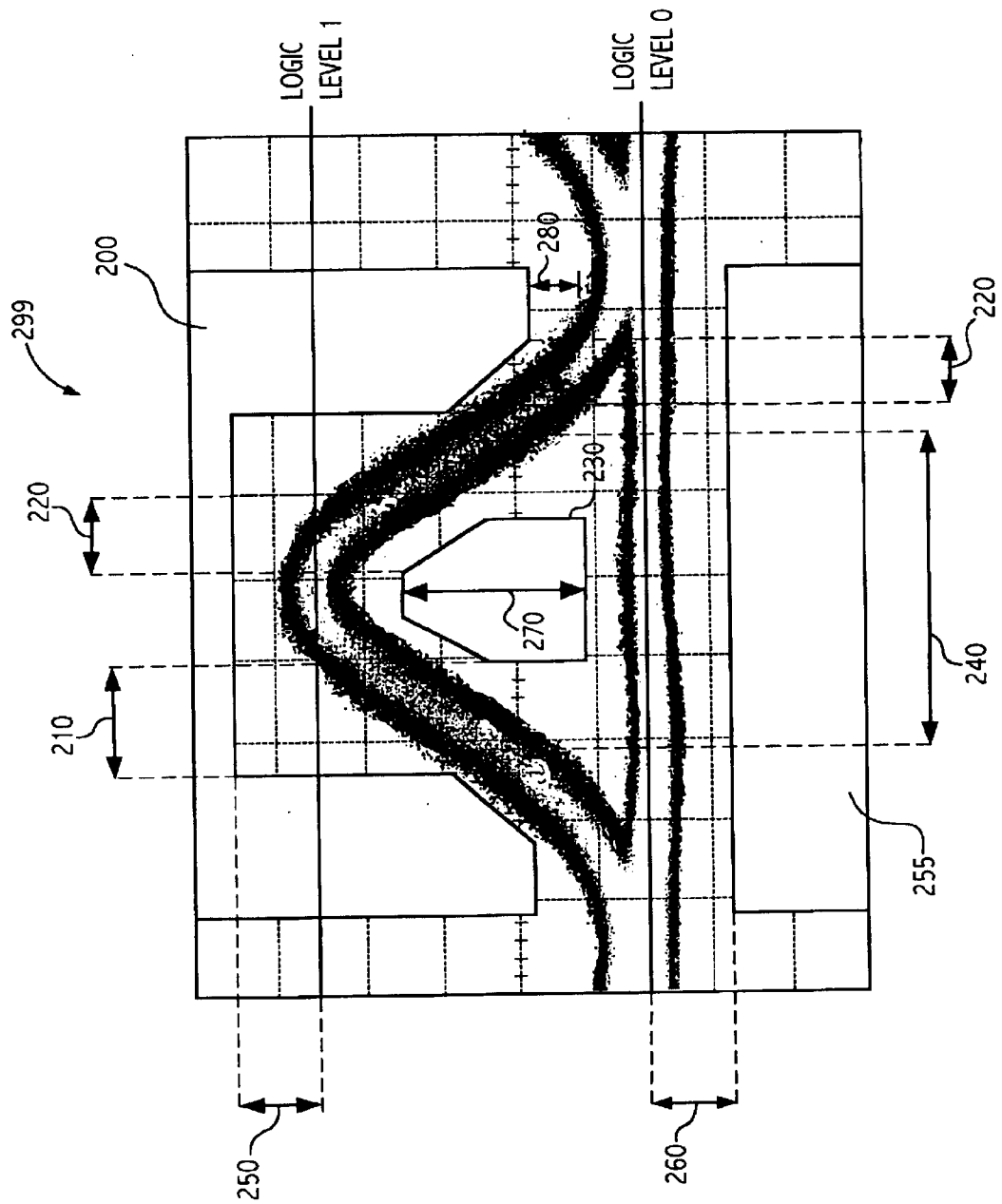
FIG. 2 shows an embodiment in accordance with the invention comprising the RZ parameters.

In accordance with an embodiment of the invention, RZ masks may be defined by seven parameters with respect to RZ eye diagram 201: jitter parameter 210, rise/fall time slope parameter 220 (assuming the rise time is equal to the fall time, otherwise an additional parameter is needed), eye-height parameter 240, overshoot parameter 250, undershoot parameter 260, pulse width parameter 270 and return-to-zero height parameter 280. Eye-height parameter 240, rise/fall time slope parameter, overshoot parameter 250 and undershoot parameter 260 for RZ masks have a similar relationship to the RZ wave form as the corresponding NRZ parameters have to the NRZ waveform. Jitter parameter 210 has a modified definition in the RZ case: jitter parameter 210 corresponds to the peak-to-peak jitter tolerance, as measured at the level corresponding to 50% of the eye-height. Pulse width parameter 270 reflects the minimum pulse width, also measured at the 50% eye-height level. The return-to-zero feature of the RZ signal is represented by return-to-zero height parameter 280. Return-to-zero height parameter 280 is defined as the relative height of the physical "0" level of logic "1" with respect to the physical "0" level of logic "0". Three mask regions 200, 230 and 255 are needed for the definition of the RZ mask as seen in FIG. 2. Region 200 prevents overshoot from logic "1" and guarantees the return-to-zero property, region 230 enforces constraints on the minimum eye opening while region 255 prevents undershoot from logic "0". The values for the seven mask parameters establish the boundaries for mask regions 200, 230 and 255. Note that mask regions 200, 230 and 255 need not be polygons and their depiction as polygons is merely exemplary.

The five NRZ eye mask parameters and the seven RZ eye mask parameters provide a relative specification of the mask. Providing absolute horizontal units requires the specification of the bit rate and providing absolute vertical units requires the specification of the logic "1" and "0" levels. Horizontal coordinates are typically normalized to be in the range of from zero to one.

Figure 3:
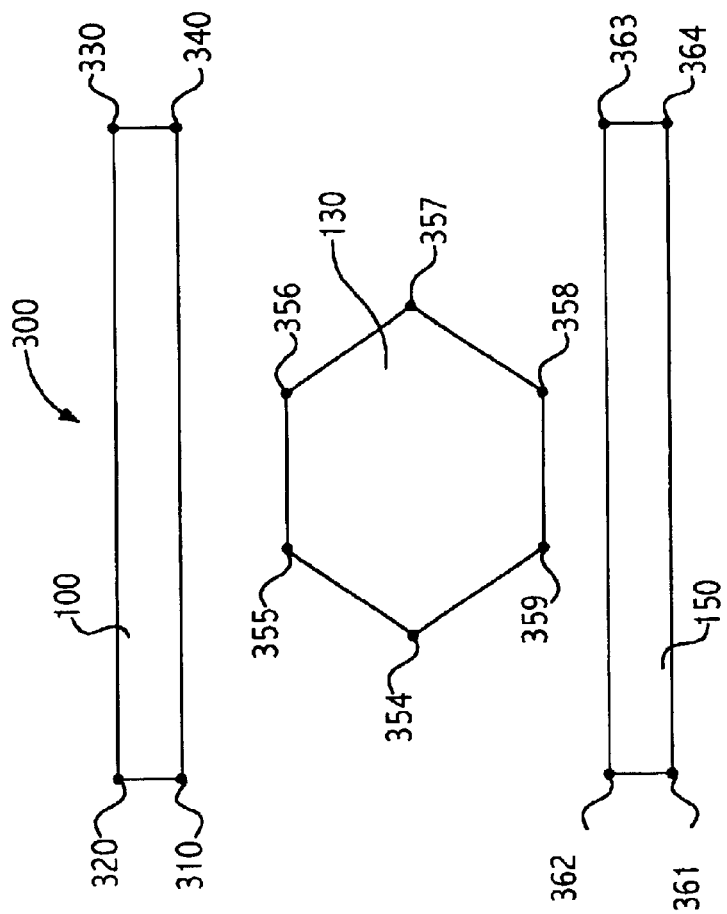
FIG. 3 shows an embodiment in accordance with the invention comprising an NRZ mask template.

The five NRZ eye mask parameters in FIG. 1 are related to eye mask regions 100, 130 and 150 in an embodiment in accordance with the invention as described below and with reference to FIG. 3. FIG. 3 shows NRZ eye mask template 300 and accompanying vertices. Specifically, the five NRZ eye mask parameters are functionally related to the vertices of eye mask regions 100, 130 and 150. This also allows the eye mask regions to be readily displayed on a video display device. Eye mask regions may be displayed in scaled coordinates by deriving the vertices of the eye mask regions from the five NRZ eye mask parameters. Note that the "seed" for the NRZ eye mask creation process is typically an NRZ eye mask template that specifies the basic shape of regions 100, 130 and 150 or the number of vertices used for each region 100, 130 and 150. In accordance with an embodiment of the invention, eye mask parameter overshoot 160 is associated only with region 100, eye mask parameter undershoot 180 is only associated with region 150 and eye mask parameters jitter 110, slope 120, eye height 140 are only associated with region 130. Vertices calculated from the input NRZ eye mask parameters are associated with the appropriate region. The respective vertices associated with each region 100, 130 and 150 are connected to their nearest neighbor in either a clockwise or counter-clockwise progressing fashion. Vertices 310, 320, 330 and 340 of region 100 are defined in normalized x and y coordinates by eye mask parameters from the set comprising jitter 110, slope 120, eye height 140, overshoot 160 and undershoot 180 as follows:

$$\text{Vertex 310 } (x, y)=(0, \min(1+\text{over\_shoot}, \text{Max\_}y)) \quad (1)$$

$$\text{Vertex 320 } (x, y)=(0, \text{Max\_}y) \quad (2)$$

$$\text{Vertex 330 } (x, y)=(1, \text{Max\_}y) \quad (3)$$

$$\text{Vertex 340 } (x, y)=(1, \min(1+\text{over\_shoot}, \text{Max\_}y)) \quad (4)$$

Where Max_y is the maximum allowable value for the y coordinate and is a number greater than 1 and over_shoot= overshoot 160. Min is the well-known "minimum" function that returns the smaller of the two values it operates on. Again in reference to FIG. 3, the vertices 354, 355, 356, 357, 358 and 359 of region 130 are defined in normalized x and y coordinates by eye mask parameters from the set comprising jitter 110, rise/fall time slope 120, eye height 140, overshoot 160 and undershoot 180 as follows:

$$\text{Vertex 354 } (x, y)=(\text{jitter}, \text{Center\_}y) \quad (5)$$

$$\text{Vertex 355 } (x, y)=(\text{jitter}+\text{slope}, \text{Center\_}y+\text{eye\_height}/2) \quad (6)$$

$$\text{Vertex 356 } (x, y)=(1-\text{jitter}-\text{slope}, \text{Center\_}y+\text{eye\_height}/2) \quad (7)$$

$$\text{Vertex 357 } (x, y)=(1-\text{jitter}, \text{Center\_}y) \quad (8)$$

$$\text{Vertex 358 } (x, y)=(1-\text{jitter}-\text{slope}, \text{Center\_}y-\text{eye\_height}/2) \quad (9)$$

$$\text{Vertex 359 } (x, y)=(\text{jitter}+\text{slope}, \text{Center\_}y-\text{eye height}/2) \quad (10)$$

Where Center_y is the center of the eye mask in the y direction and is typically set to the value 0.5 in accordance with an embodiment of the invention, eye_height=eye height 140, jitter=jitter 110 and slope=rise/fall time slope 120. Again in reference to FIG. 3, the vertices 361, 362, 363 and 364 of region 150 are defined in normalized x and y coordinates by the eye mask parameters from the set comprising jitter 110, slope 120, eye height 140, overshoot 160 and undershoot 180 as follows:

$$\text{Vertex 361 } (x, y)=(0, \text{Min\_}y) \quad (11)$$

Vertex 362 $(x, y)=(0, \max(-\text{under\_shoot}, \text{Min\_}y))$ (12)

Vertex 363 $(x, y)=(1, \max(-\text{under\_Shoot}, \text{Min\_}y))$ (13)

Vertex 364 $(x, y)=(1, \text{Min\_}y)$ (14)

Where Min_y is the minimum allowable value for the y coordinate and is a number less than zero and under_shoot=undershoot 160. Max is the well-known "maximum" function that returns the larger of the two values it operates on.

Figure 4:
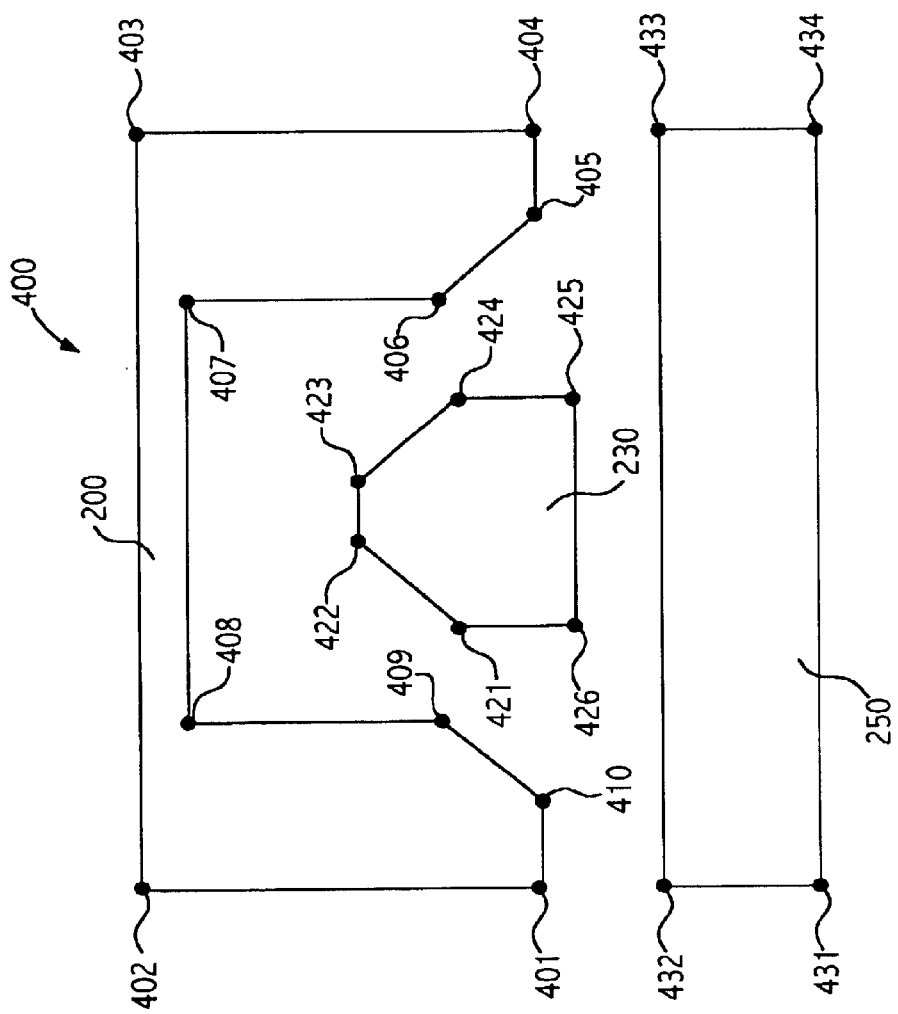
FIG. 4 shows an embodiment in accordance with the invention comprising an RZ mask template.

The seven RZ eye mask parameters in FIG. 2 are related to eye mask regions 200, 230 and 255 in an embodiment in accordance with the invention as described below and with reference to FIG. 4. FIG. 4 shows RZ eye mask template 400 and accompanying vertices. Specifically, the seven RZ eye mask parameters are functionally related to the vertices of polygonal eye mask regions 200, 230 and 255. This also allows the eye mask regions to be readily displayed on a video display device. RZ eye mask regions may be generated in scaled coordinates by specifying the seven eye mask parameters from which the vertices of the eye mask regions are derived. Note that the "seed" for the RZ eye mask creation process is typically an RZ eye mask template that specifies the basic shape of regions 200, 230 and 255 or the number of vertices used for each region 200, 230 and 255. In accordance with an embodiment of the invention, eye mask parameter overshoot 250 is associated only with region 200, eye mask parameter undershoot 260 is only associated with region 255 and eye mask parameters jitter 210, rise/fall time slope 220, eye height 240, pulse width 270 and return to zero height 280 are only associated with region 230. Vertices calculated from the input NRZ eye mask parameters are associated with the appropriate region. The respective vertices associated with each region 200, 230 and 255 are connected to their nearest neighbor in either a clockwise or counterclockwise fashion. With reference to FIG. 4, the vertices 401, 402, 403, 404, 405, 406, 407, 408, 409 and 410 of region 200 are defined in normalized x and y coordinates by eye mask parameters from the RZ eye mask parameter set comprising jitter 210, rise/fall time slope 220, eye height 240, overshoot 250, undershoot 260, pulse width 270 and return-to-zero height (RZ height) 280 as follows:

Vertex 401 $(x, y)=(0, \text{Center\_}y-\text{eye\_height}/2+\text{RZ\_height})$ (15)

Vertex 402 $(x, y)=(0, \text{Max\_}y)$ (16)

Vertex 403 $(x, y)=(1, \text{Max\_}y)$ (17)

Vertex 404 $(x, y)=(1, \text{Center\_}y-\text{eye\_height}/2+\text{RZ\_height})$ (18)

Vertex 405 $(x, y)=((1+\text{pulse\_width}+\text{jitter})/2+\text{slope}, \text{Center\_}y-\text{eye\_height}/2+\text{RZ\_height})$ (19)

Vertex 406 $(x, y)=((1+\text{pulse\_width}+\text{jitter})/2, \text{Center\_}y+\text{RZ\_height})$ (20)

Vertex 407 $(x, y)=((1+\text{pulse\_width}+\text{jitter})/2, \min(1+\text{over\_shoot}, \text{Max\_}y))$ (21)

Vertex 408 $(x, y)=((1-\text{pulse\_width}-\text{jitter})/2, \min(1+\text{over\_shoot}, \text{Max\_}y))$ (22)

Vertex 409 $(x, y)=((1-\text{pulse\_width}-\text{jitter})/2, \text{Center\_}y+\text{RZ\_height})$ (23)

Vertex 410 $(x, y)=((1-\text{pulse\_width}-\text{jitter})/2-\text{slope}, \text{Center\_}y-(\text{eye\_height})/2+\text{RZ\_height})$ (24)

where eye_height=eye height 240, pulse_width=pulse width 270, RZ_height=RZ height 280, jitter=jitter 210 and slope=rise/fall time slope 220

With reference to FIG. 4, the vertices 421, 422, 423, 424, 425 and 426 of region 230 are defined in normalized x and y coordinates by eye mask parameters from the set comprising jitter 210, rise/fall time slope 220, eye height 240, overshoot 250, undershoot 260, pulse width 270 and return-to-zero height (RZ height) 280 as follows:

Vertex 421 $(x, y)=((1-\text{pulse\_width}+\text{jitter})/2, \text{Center\_}y)$ (25)

Vertex 422 $(x, y)=((1-\text{pulse\_width}+\text{jitter})/2+\text{slope}, \text{Center\_}y+\text{eye\_height}/2)$ (26)

Vertex 423 $(x, y)=((1+\text{pulse\_width}-\text{jitter})/2-\text{slope}, \text{Center\_}y+\text{eye\_height}/2)$ (27)

Vertex 424 $(x, y)=((1+\text{pulse\_width}-\text{jitter})/2, \text{Center\_}y)$ (28)

Vertex 425 $(x, y)=((1+\text{pulse\_width}-\text{jitter})/2, \text{Center\_}y-\text{eye\_height}/2)$ (29)

Vertex 426 $(x, y)=((1-\text{pulse\_width}+\text{jitter})/2, \text{Center\_}y-\text{eye\_height}/2)$ (30)

where pulse_width=pulse width 270, jitter=jitter 210, slope=rise/fall time slope 220, eye_height=eye height 240.

With reference to FIG. 4, the vertices 431, 432, 433 and 434 of mask region 255 are defined in normalized x and y coordinates by eye mask parameters from the set comprising jitter 210, rise/fall time slope 220, eye height 240, overshoot 250, undershoot 260, pulse width 270 and return-to-zero height (RZ height) 280 as follows:

Vertex 431 $(x, y)=(0, \text{Min\_}y)$ (31)

Vertex 432 $(x, y)=(0, \max(-\text{under\_shoot}, \text{Min\_}y))$ (32)

Vertex 433 $(x, y)=(1, \max(-\text{under\_shoot}, \text{Min\_}y))$ (33)

Vertex 434 $(x, y)=(1, \text{Min\_}y)$ (34)

where under_shoot=undershoot 260.

Figure 5:
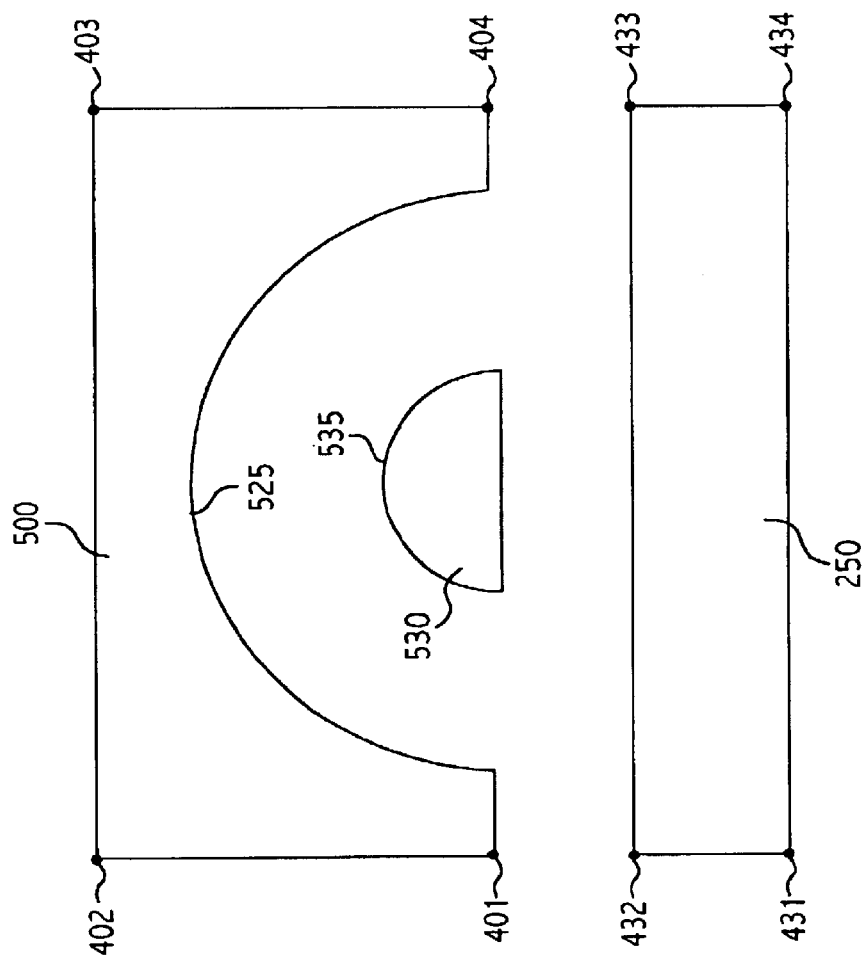
FIG. 5 shows an embodiment in accordance with the invention comprising an RZ mask template.

In accordance with an embodiment of the invention, portions of the eye mask region boundary may be represented by analytical functions, for example, with respect to the RZ mask regions 200 and 230. Analytical function specification of portions of the eye mask region boundary provide the user with additional flexibility regarding the boundary shape. With reference to FIG. 5, mask region 530 is shown partly bounded by curve 535, defined by function f1:

Curve 535 $(x, y)=\text{f1}(\text{pulse\_width}, \text{jitter}, \text{slope}, \text{eye\_height})$ (35)

and mask region 530 is shown partly bounded by curve 535, defined by function f2:

Curve 525 $(x, y)=\text{f2}(\text{pulse\_width}, \text{jitter}, \text{slope}, \text{eye\_height}, \text{RZ\_height}, \text{over\_shoot})$ (36)

where pulse_width=pulse width 270, jitter=jitter 210, eye_height=eye height 240, slope=rise/fall time slope 220, over_shoot=overshoot 250 and RZ_height=RZ height 280.

In particular, f1 and f2 may be Gaussians. Note that in using a Gaussian, rise/fall time slope parameter 220 is implicit in the function and is not independent of jitter 210 and pulse width 270. Hence, for equally spaced points, the boundary points of region 255 are then given by:

$$x_i = x_0 + i(x_N - x_0)/N$$ (37)

$$y_i = y_0 + A \exp(-4(x_i - x_{center})^2 / x_{width}^2)$$ (38)

where N are the total number of points, i=[1, N], $x_0=(1.0-x_{width})/2$, $x_N=(1.0+x_{width})/2$, $x_{width}$=pulse_width−jitter, $x_{center}=0.5$, A=eye_height, $x_{center}=0.5$ and $y_0$=Center_y− eye_height and with pulse_width=pulse width 270, jitter=jitter 210 and eye_height=eye height 240.

Likewise, boundary curve 525 for region 500 taking equally spaced points is given by:

$$x_i = x_0 + i(x_N - x_0)/N \quad (39)$$

$$y_i = y_0 + A \exp(-4(x_i - x_{center})^2 / x_{width}^2) \quad (40)$$

where N are the total number of points, i=[1, N], $x_0$=(1.0−$x_{width}$)/2, $x_N$=(1.0+$x_{width}$)/2, $x_{width}$=pulse_width+jitter, $x_{center}$=0.5, A=1.0+over_shoot−Center_y+eye_height/2−RZ_height and $y_0$=Center_y+RZ_height 280−eye_height/2, where pulse_width=pulse width 270, jitter=jitter 210, eye_height=eye height 240, over_shoot=overshoot 250 and RZ_height=RZ height 280.

N is taken to be a suitably large number so that the discretization yields a boundary that appears relatively smooth to the user.

Modification of an eye mask in accordance with the invention may be implemented in a number of ways. One embodiment in accordance with the invention employs a digital oscilloscope having a central processor unit and digital communication analyzer capabilities such as the AGILENT 86100A Wide-Bandwidth Oscilloscope or the TEKTRONIX CSA 8000. Another implementation in accordance with the invention involves the use of a personal computer or workstation to modify an eye mask. Modification typically involves changing existing eye mask template 300 or eye mask template 400 to create a custom eye mask pattern or making changes to a custom eye mask pattern. Depending on whether the eye mask to be created is of the type RZ (see FIGS. 6–12) or NRZ (see FIGS. 13–17) eye mask template 400 or eye mask template 300, respectively, is selected to display on the video display. Note that FIGS. 6–12 and FIGS. 13–17 suppress the eye diagram onto which the respective eye mask templates would normally be mapped. Typically, eye mask templates 300 and 400 or the eye mask pattern that is to be modified are downloaded from a data storage device. If a live signal input is present, eye mask template 300 or 400 is auto-aligned with the signal so that the beginning of eye mask template 300 or 400, the logic 1 level and the logic 0 level are aligned with live input signal. In the case of the NRZ signal, the beginning position of eye mask template 300 is aligned with the crossing point of the NRZ signal. In the case of the RZ signal, the beginning position of eye mask template 400 is aligned with the center of two adjacent eye pulses such that eye mask template 400 is centered around the eye pulse. The bit period is typically adjusted by the user using a mask scaling function. If a live signal is not present, the user typically specifies the values for the beginning position of eye mask template 300 or 400, the logic 1 level, logic 0 level, and the bit-period via a mask scaling function that typically scales the eye mask with the signal units. . An alternative embodiment in accordance with the invention uses a personal computer and the associated video display for modifying eye mask template 300 or 400 which is loaded from a file on a data storage device. In this embodiment, a live signal is typically not present and an eye diagram generated from a live signal is stored in a file on a data storage device. The stored eye diagram is scaled and loaded into the personal computer for presentation on the video display and alignment with the reference eye mask. Scaling of eye mask template 300 or 400 may be either to the signal units or normalizing the signal to the mask If the user desires to create an eye mask without a reference to a live or stored signal, such as might occur when using a personal computer or work station, mask scaling may be ignored altogether.

In accordance with an embodiment of the invention, each eye mask parameter is associated with a control means that is typically a button, knob or touch screen control if using an oscilloscope for display. A personal computer having a video display with a graphical user interface where each eye mask parameter is associated with, for example, an on screen button. The on screen button may be activated with a pointing device, typically a computer mouse. For symmetric (assuming the rise time is equal to the fall time) RZ template mask 400 (see FIG. 4) there are seven control means corresponding to the seven RZ eye mask parameters: jitter parameter 210, pulse width parameter 270, rise/fall time slope parameter 220, eye height parameter 240, return-to-zero height parameter 280, undershoot parameter 260 and overshoot parameter 250. For symmetric (assuming the rise time is equal to the fall time ) NRZ template eye mask 300 (see FIG. 13) there are five control means corresponding to the five NRZ eye mask parameters: jitter parameter 110, rise/fall time parameter 120, eye height parameter 140, undershoot parameter 180 and over shoot parameter 160. In the event of asymmetric template masks where rise time is not equal to fall time, an additional control means is typically used to adjust the extra parameter that is needed.

An interactive way to alter the value of the eye mask parameter in an embodiment in accordance with the invention typically uses position markers and is used on a digital oscilloscope. To alter the value of an eye mask parameter, the corresponding control means is activated. Activation of the control means associates two position markers with the selected eye mask parameter that may be displayed on the oscilloscope screen or computer screen. The first position marker identifies the reference position and stays fixed while the second position marker is moved and identifies the variable position. Typically, position markers are horizontal or vertical lines. The adjustable position is typically dynamically limited to allow movement of the second marker only within a certain range, between a minimum and maximum value, to preserve the overall eye mask shape. The eye mask is redrawn after the second position marker has been moved. After the eye mask has been modified, the eye mask may be saved to a data storage device for later use or subsequent further modification. In accordance with another embodiment of the invention, the altered eye mask parameter values may be input from a touch screen keypad or a keyboard. After the entry of each altered eye mask parameter, the eye mask is typically redrawn on the video display device to reflect the change in the altered eye mask parameter. This allows a user friendly and interactive approach to eye mask pattern creation.

Figure 6:
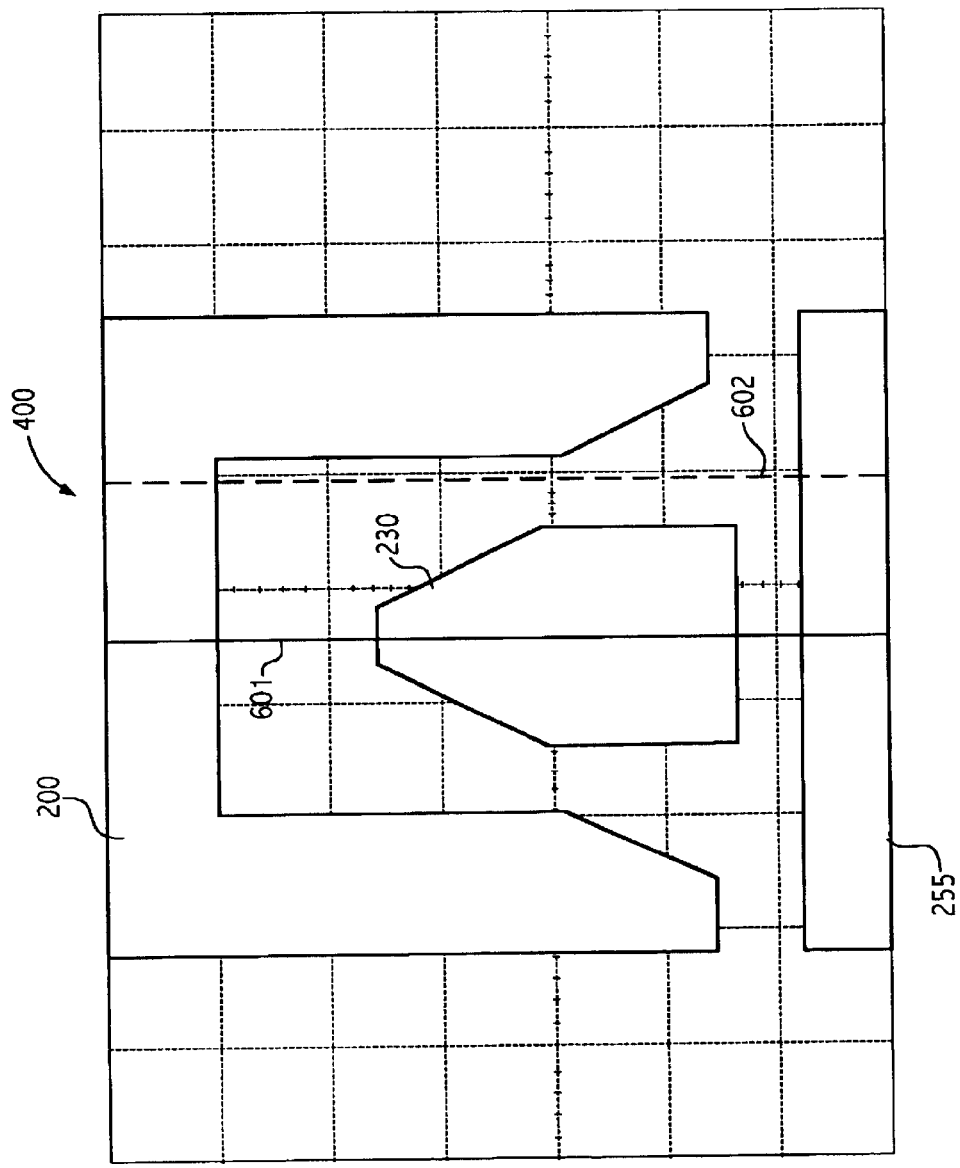
FIG. 6 shows an embodiment in accordance with the invention comprising a user interface for modifying the pulse width parameter of an RZ mask template.

In accordance with an embodiment of the invention, FIG. 6 shows adjustment of pulse width parameter 270 for RZ template mask 400. Position marker 601 is centered on polygon 230 and serves as a fixed reference during adjustment of pulse width parameter 270. To change pulse width 270, position marker 602 is displaced a distance equal to half of the desired new pulse width 270 with respect to position marker 601. After movement of position marker 602, RZ template mask 400 is recalculated and redrawn to reflect the change in pulse width parameter 270 while preserving jitter parameter 210. The minimum allowed value of pulse width parameter 270 is 0 and the maximum allowed value is 1.

Figure 7:
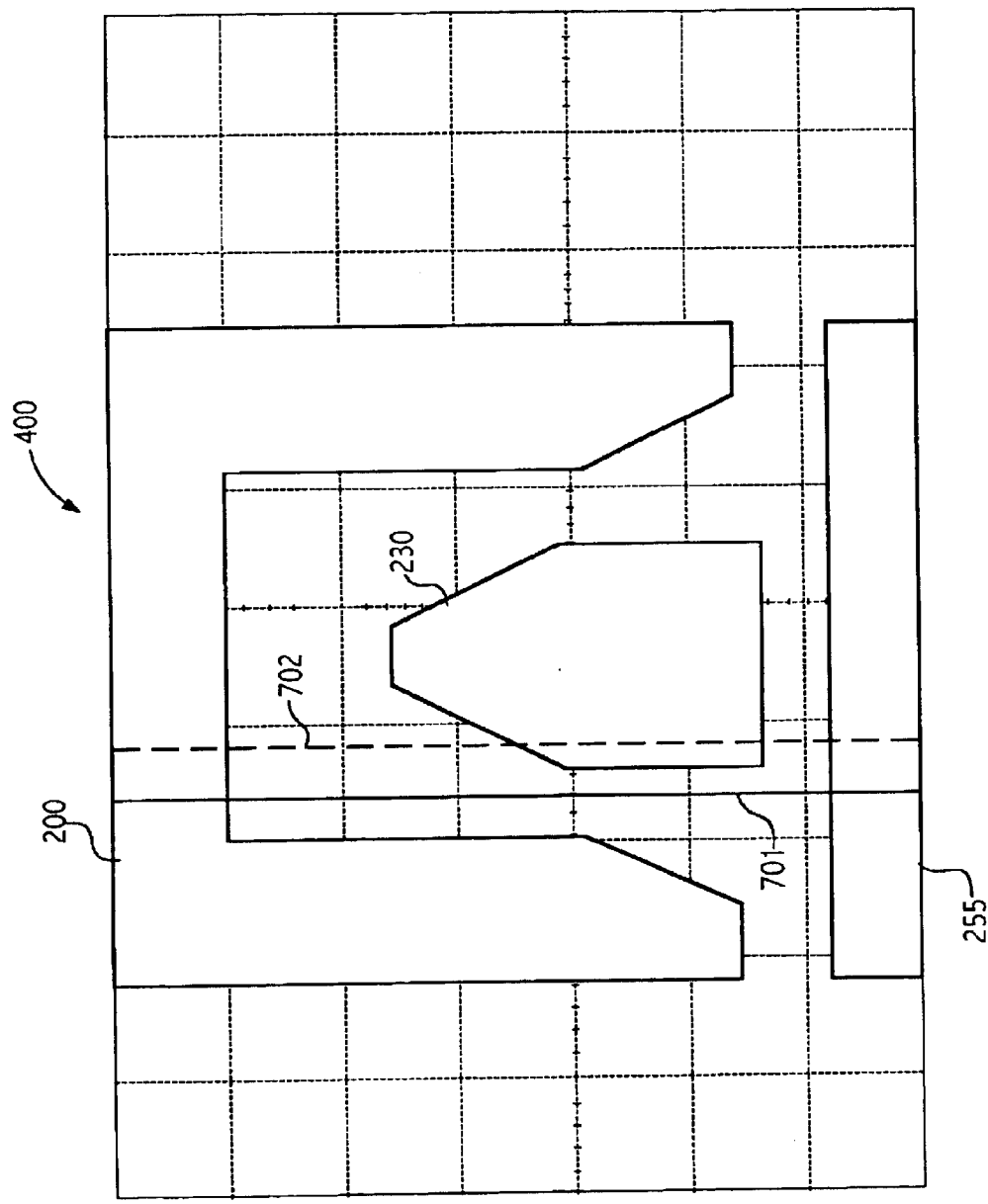
FIG. 7 shows an embodiment in accordance with the invention comprising a user interface for modifying the jitter parameter of an RZ mask template.

In accordance with an embodiment of the invention, FIG. 7 shows adjustment of jitter parameter 210 for RZ template mask 400. Position marker 701 is positioned at the midpoint of jitter parameter 210 and serves as a fixed reference during adjustment of jitter parameter 210. To change jitter 210, position marker 702 is displaced a distance equal to half of the desired new jitter 210 with respect to position marker 701. After movement of position marker 702, RZ template mask 400 is recalculated and redrawn to reflect the change in jitter parameter 210 and preserve pulse width parameter 270. The minimum allowed value of jitter parameter 210 is 0 and the maximum allowed value is the minimum of (pulse width 270, 1−pulse width 270).

Figure 8:
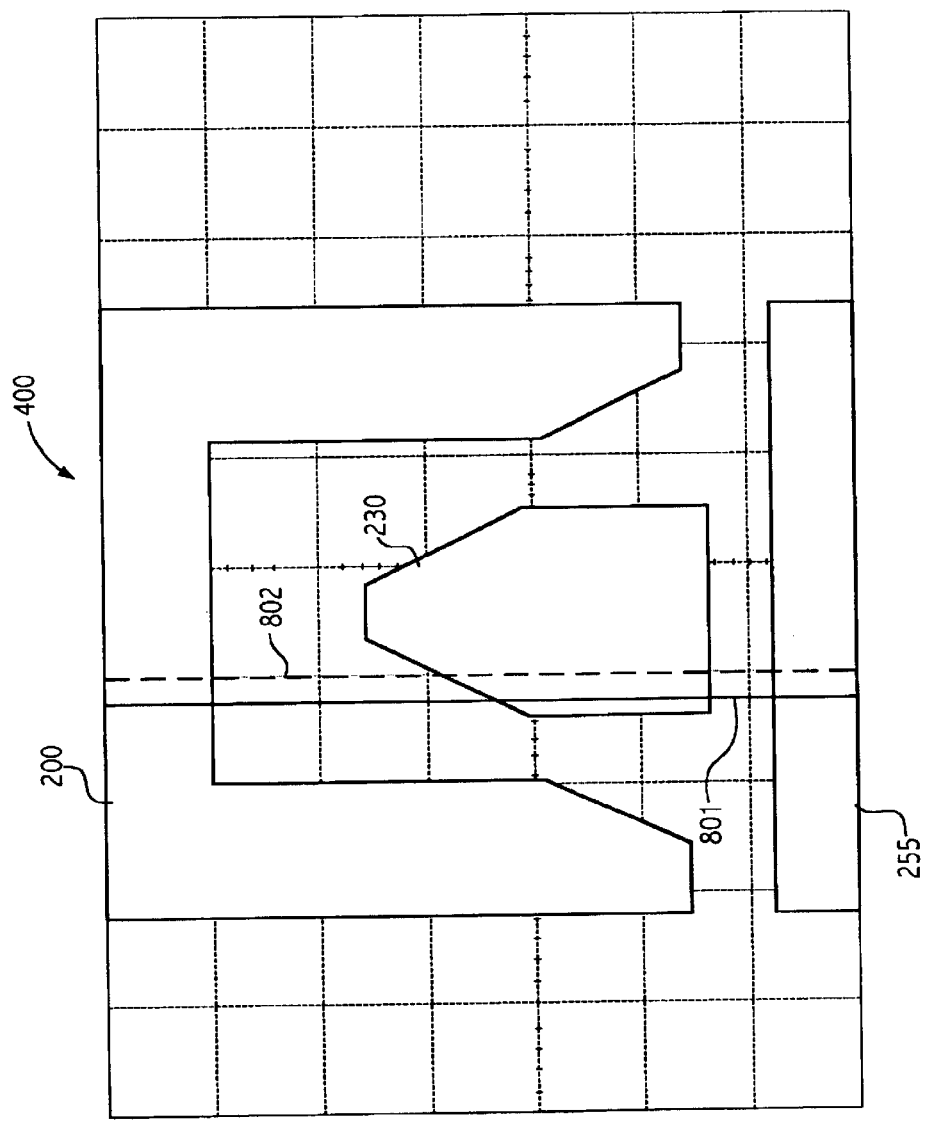
FIG. 8 shows an embodiment in accordance with the invention comprising a user interface for modifying the rise/fall time slope parameter of an RZ mask template.

In accordance with an embodiment of the invention, FIG. 8 shows adjustment of rise/fall time slope parameter 220 for RZ template mask 400. Position marker 801 is aligned with the start of the rise as shown in FIG. 8 and serves as a fixed reference during adjustment of rise/fall time slope parameter 220. To change rise/fall time slope parameter 220, position marker 702 is displaced a distance equal to the desired new rise/fall time slope parameter 220 with respect to position marker 701. After movement of position marker 702, RZ template mask 400 is recalculated and redrawn to reflect the change in rise/fall time slope parameter 220. The minimum allowed value for rise/fall time slope parameter 220 is 0 and the maximum allowed value is the minimum of ((pulse width 270−jitter 210)/2, (1−pulse width 270−jitter 210)/2).

Figure 9:
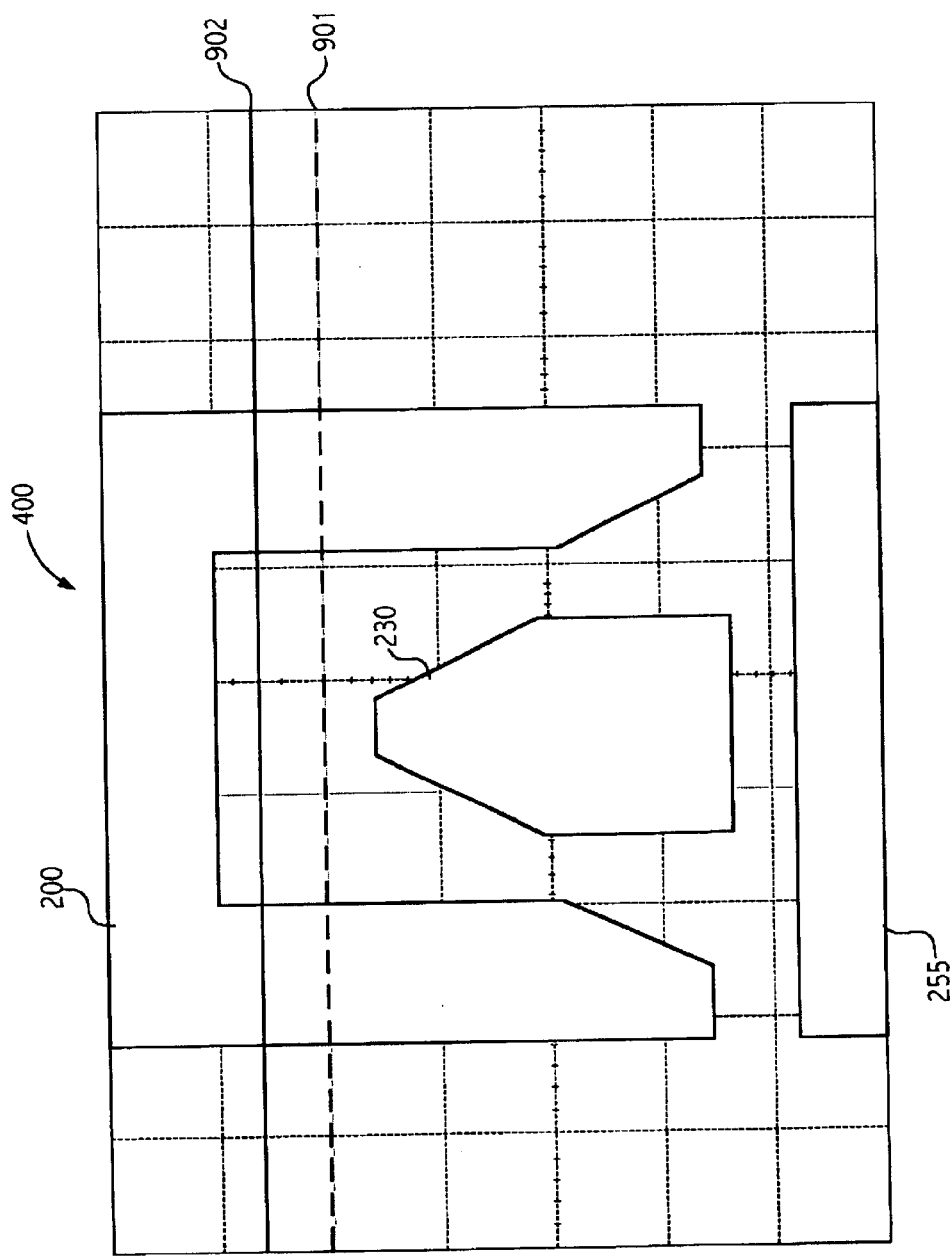
FIG. 9 shows an embodiment in accordance with the invention comprising a user interface for modifying the overshoot parameter of an RZ mask template.

In accordance with an embodiment of the invention, FIG. 9 shows adjustment of overshoot parameter 250 for RZ template mask 400. Position marker 901 is aligned with the logic 1 level as shown in FIG. 9 and serves as a fixed reference during adjustment of overshoot 250. To change overshoot 250, position marker 902 is displaced a distance equal to the desired new overshoot 250 with respect to position marker 901. After movement of position marker 902, RZ template mask 400 is recalculated and redrawn to reflect the change in overshoot 250. The minimum allowed value for overshoot parameter 250 is 0 and the maximum allowed value for overshoot parameter 250 is Max_y−1.

Figure 10:
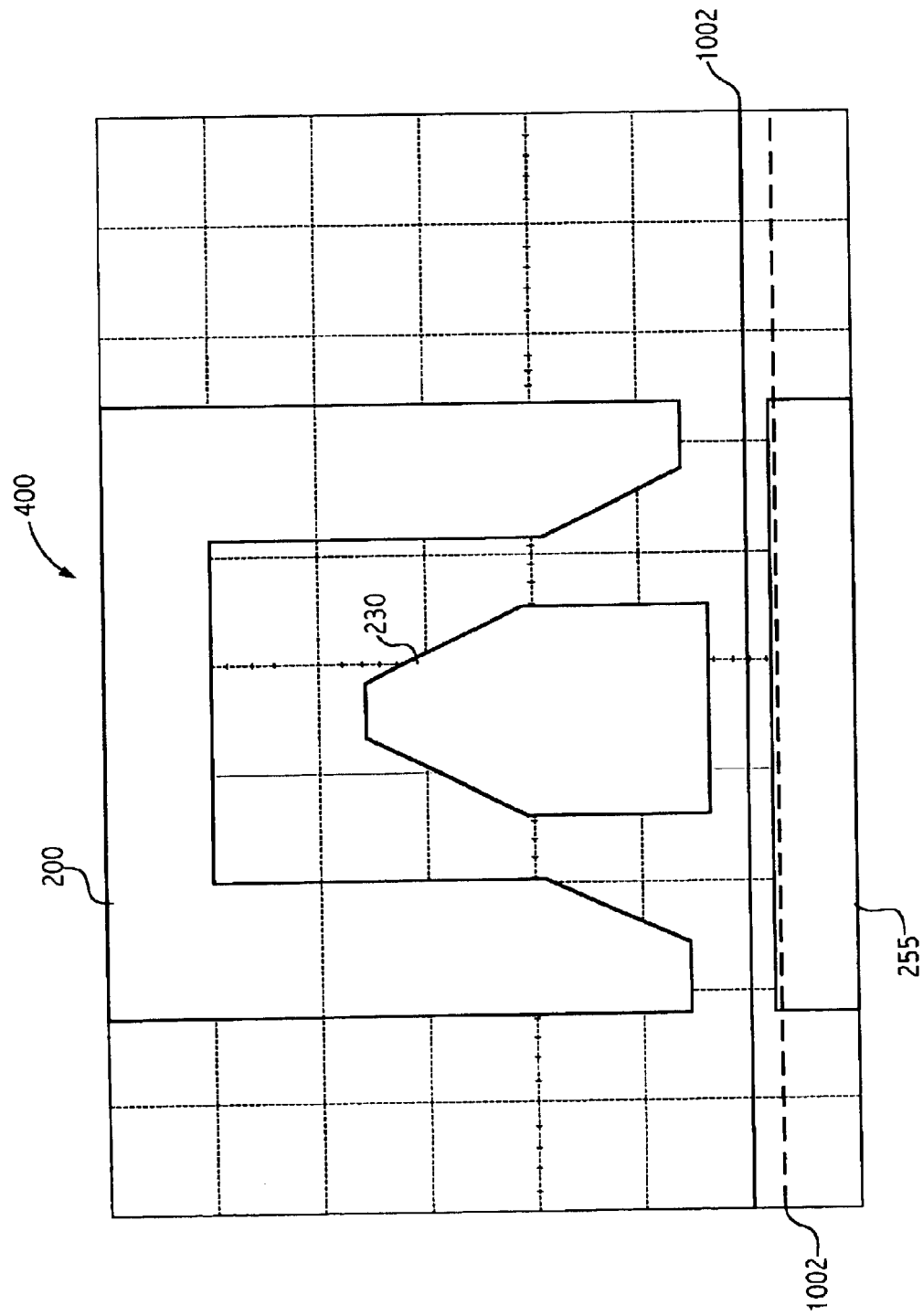
FIG. 10 shows an embodiment in accordance with the invention comprising a user interface for modifying the undershoot parameter of an RZ mask template.

In accordance with an embodiment of the invention, FIG. 10 shows adjustment of undershoot parameter 260 for RZ template mask 400. Position marker 1001 is aligned with the logic 0 level as shown in FIG. 10 and serves as a fixed reference during adjustment of undershoot 260. To change undershoot 260, position marker 1002 is displaced a distance equal to the desired new undershoot 260 with respect to position marker 1001. After movement of position marker 1002, RZ template mask 400 is recalculated and redrawn to reflect the change in undershoot 260. The minimum allowed value for undershoot parameter 260 is 0 and the allowed maximum value is −Min_y.

Figure 11:
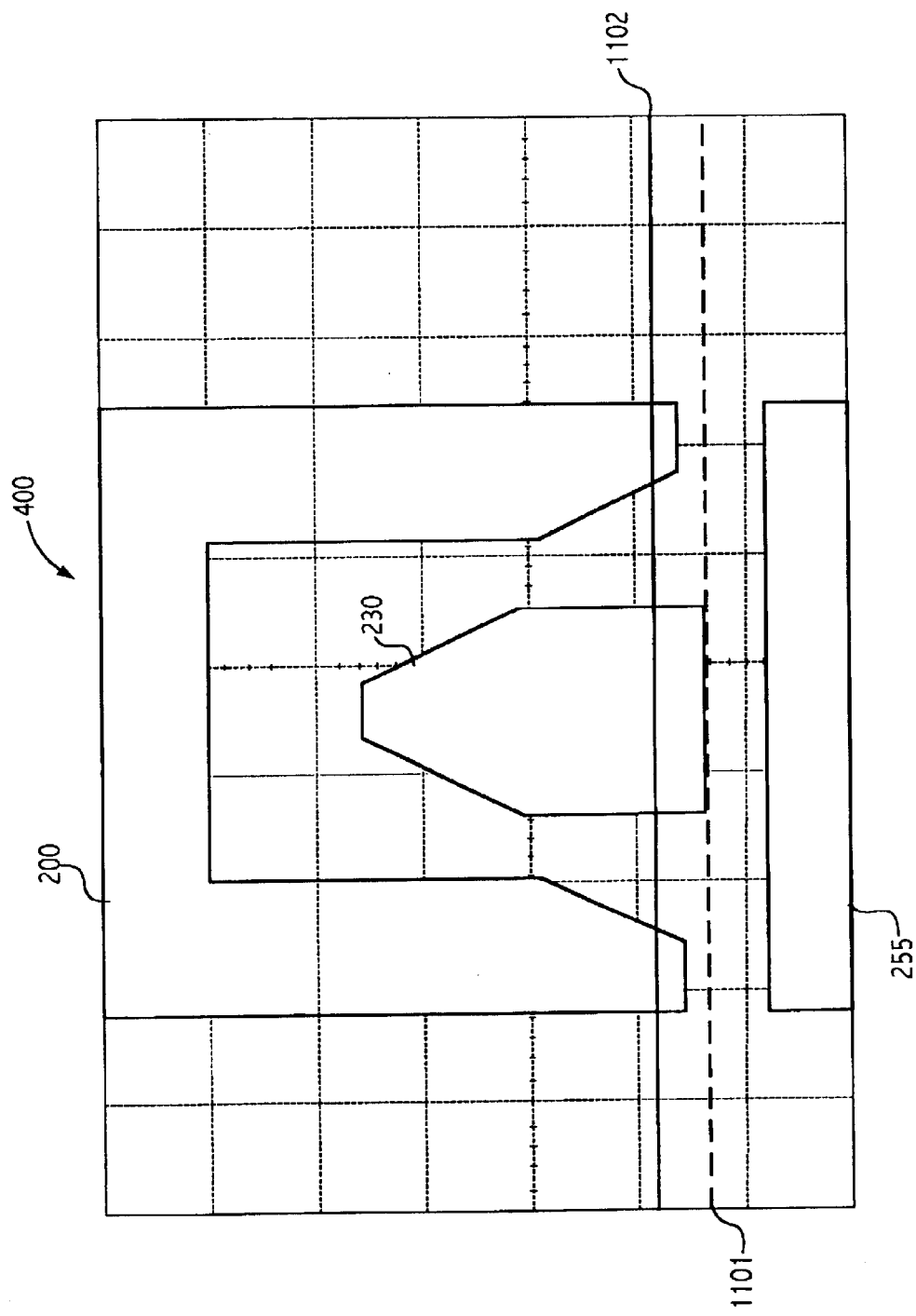
FIG. 11 shows an embodiment in accordance with the invention comprising a user interface for modifying the return to zero height parameter of an RZ mask template.

In accordance with an embodiment of the invention, FIG. 11 shows adjustment of return to zero height parameter 280 for RZ template mask 400. Position marker 1101 is aligned with the bottom of polygon 230 as shown in FIG. 11 and serves as a fixed reference during adjustment of return to zero height parameter 280. To change return to zero height parameter 280, position marker 1102 is displaced a distance equal to the desired new return to zero height parameter 280 with respect to position marker 1101. After movement of position marker 1102, RZ template mask 400 is recalculated and redrawn to reflect the change in return to zero height parameter 280. The minimum allowed value for return to zero height parameter 280 is 0 and the maximum allowed value is 1.

Figure 12:
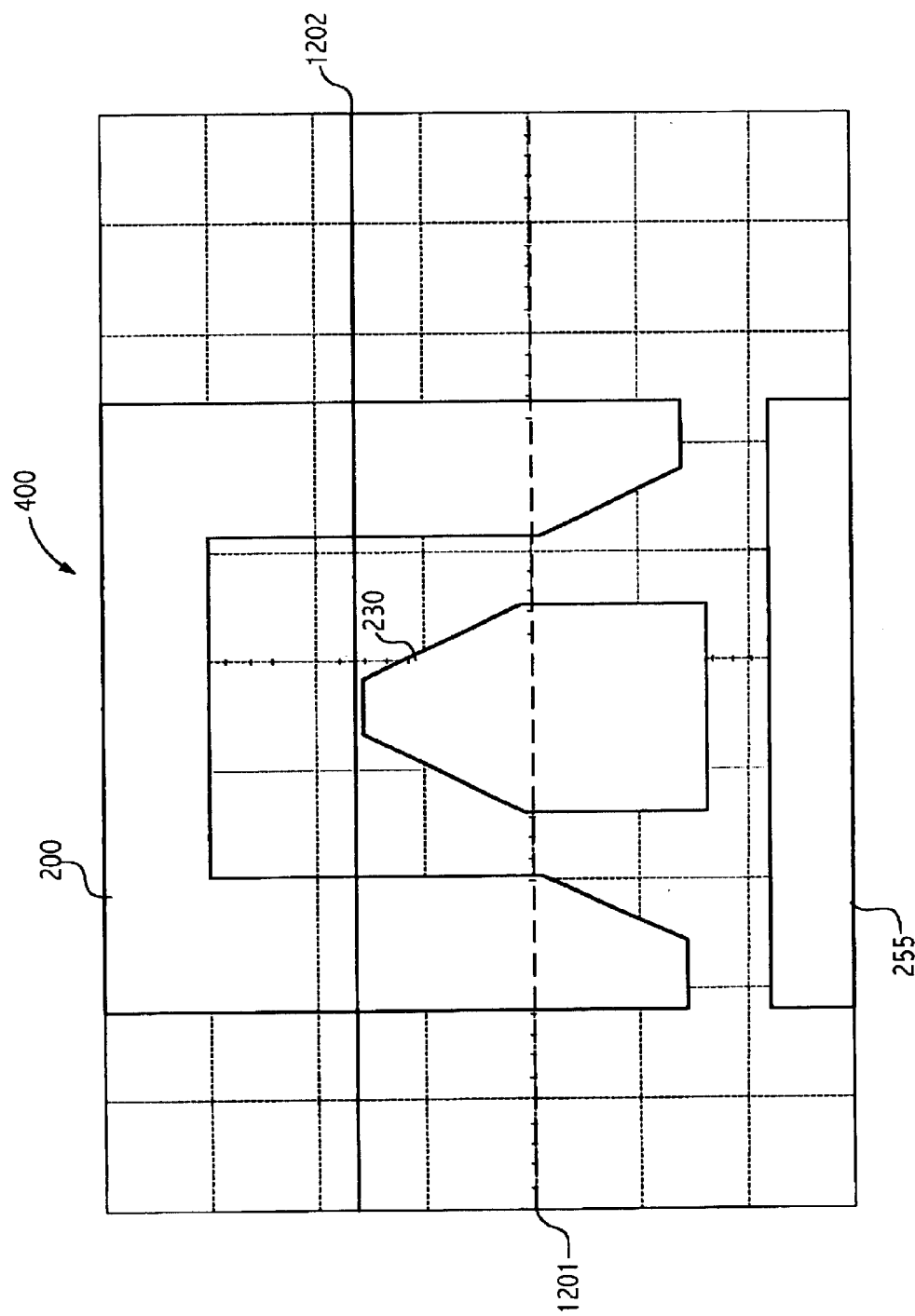
FIG. 12 shows an embodiment in accordance with the invention comprising a user interface for modifying the eye height parameter of an RZ mask template.

In accordance with an embodiment of the invention, FIG. 12 shows adjustment of eye height parameter 240 for RZ template mask 400. Position marker 1201 is aligned the middle of polygon 230 as shown in FIG. 11 and serves as a fixed reference during adjustment of eye height parameter 240. To change eye height parameter 240, position marker 1202 is displaced a distance equal to half the desired new eye height parameter 240 with respect to position marker 1201. After movement of position marker 1102, RZ template mask 400 is recalculated and redrawn to reflect the change in eye height parameter 240. The minimum allowed value for eye height parameter 240 is 0 and the maximum allowed value is 1.

Figure 13:
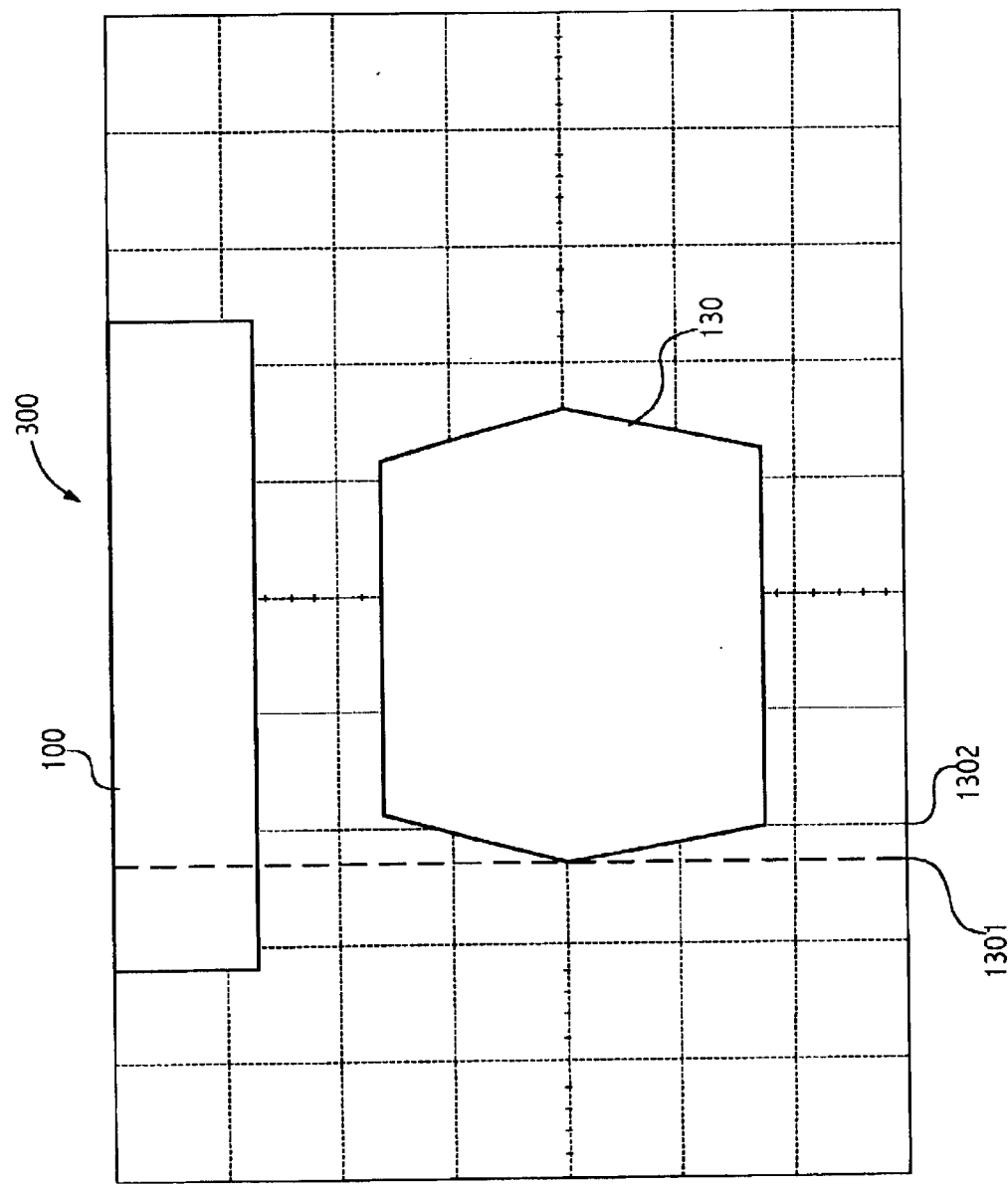
FIG. 13 shows an embodiment in accordance with the invention comprising a user interface for modifying the jitter parameter of an NRZ mask template.

In accordance with an embodiment of the invention, FIG. 13 shows adjustment of jitter parameter 110 for NRZ template mask 300. Position marker 1301 is positioned at the beginning of the bit period as shown in FIG. 13 and serves as a fixed reference during adjustment of jitter parameter 110. To change jitter 110, position marker 1302 is displaced a distance equal to the desired new jitter 110 with respect to position marker 1301. After movement of position marker 1302, NRZ template mask 300 is recalculated and redrawn to reflect the change in jitter parameter 210. The minimum allowed value for jitter parameter 110 is 0 and the maximum allowed value is 0.5.

Figure 14:
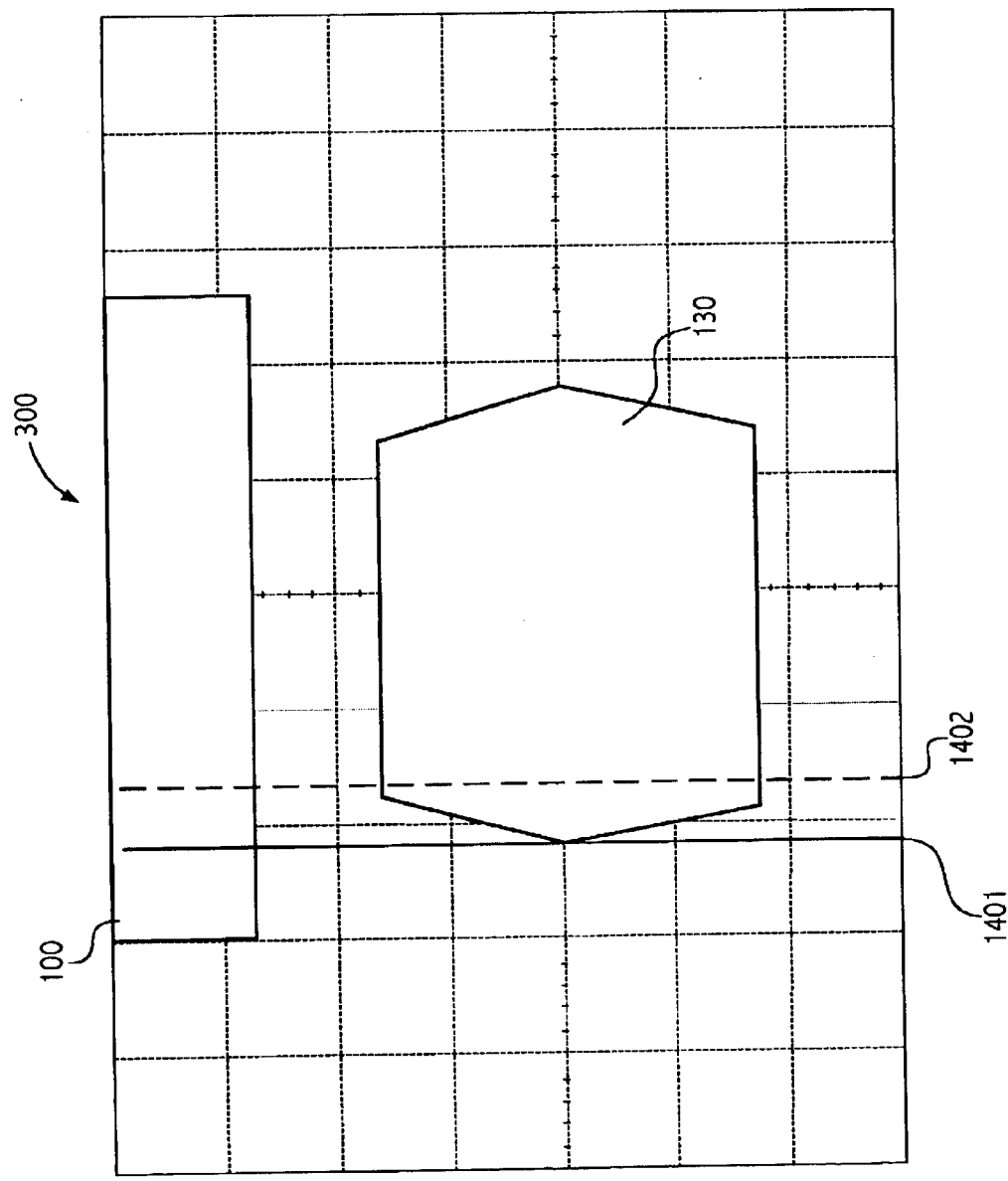
FIG. 14 shows an embodiment in accordance with the invention comprising a user interface for modifying the rise/fall time slope parameter of an NRZ mask template.

In accordance with an embodiment of the invention, FIG. 14 shows adjustment of rise/fall time slope parameter 120 for NRZ template mask 300. Position marker 1401 is aligned with the start of the rise as shown in FIG. 14 and serves as a fixed reference during adjustment of rise/fall time slope parameter 120. To change rise/fall time slope120, position marker 1402 is displaced a distance equal to the desired new rise/fall time slope 120 with respect to position marker 1401. After movement of position marker 1402, NRZ template mask 400 is recalculated and redrawn to reflect the change in rise/fall time slope parameter 120. The minimum allowed value for rise/fall time slope parameter 120 is 0 and the maximum allowed value for rise/fall time slope parameter 120 is (0.5−jitter 110).

Figure 15:
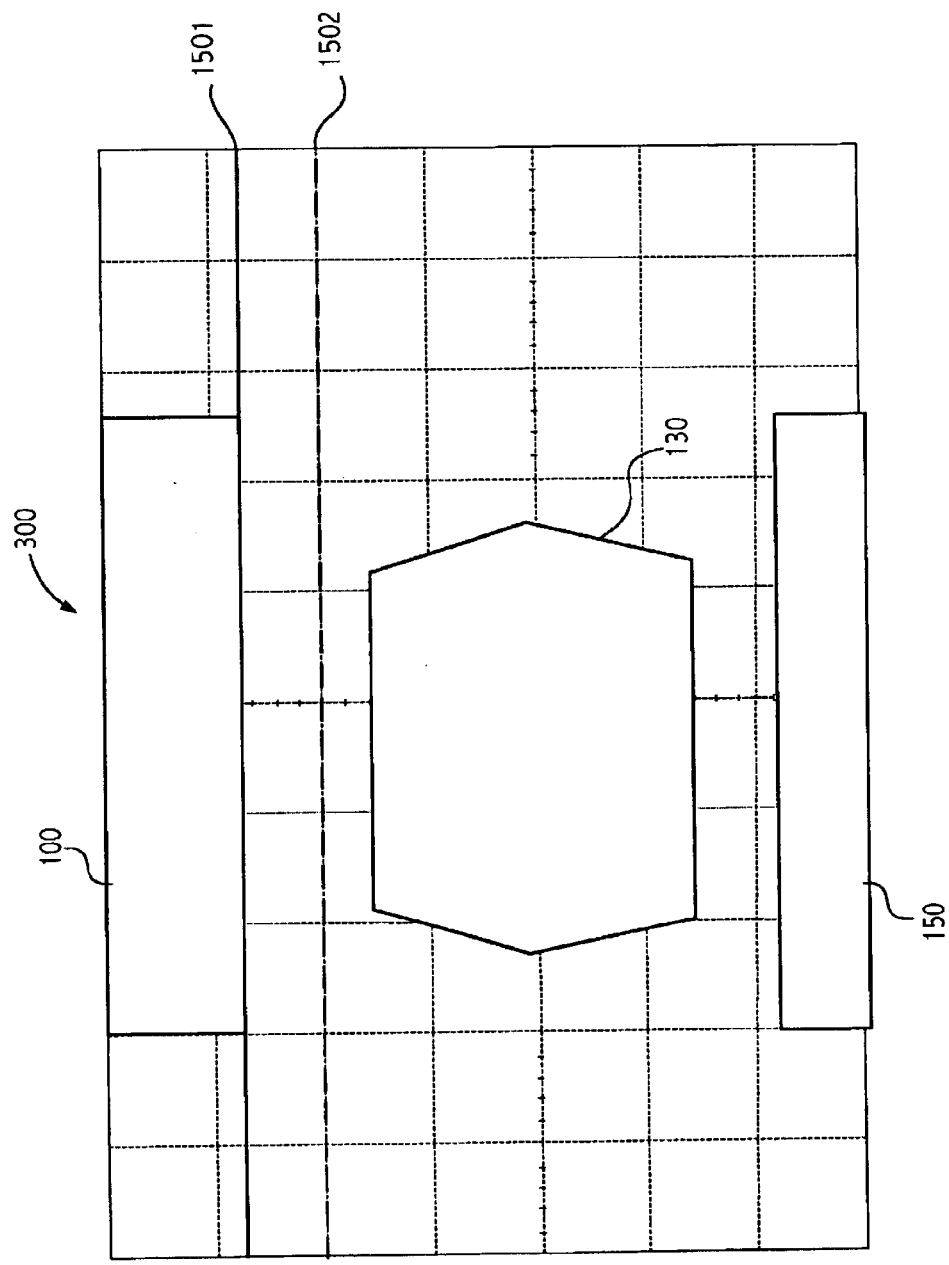
FIG. 15 shows an embodiment in accordance with the invention comprising a user interface for modifying the overshoot parameter of an NRZ mask template.

In accordance with an embodiment of the invention, FIG. 15 shows adjustment of overshoot parameter 160 for NRZ template mask 300. Position marker 1502 is aligned with the logic 1 level as shown in FIG. 15 and serves as a fixed reference during adjustment of overshoot 160. To change overshoot 160, position marker 1501 is displaced a distance equal to the desired new overshoot 160 with respect to position marker 1501. After movement of position marker 1501, RZ template mask 400 is recalculated and redrawn to reflect the change in overshoot 160. The minimum allowed value for overshoot parameter 160 is 0 and the maximum allowed value Max_y−1.

Figure 16:
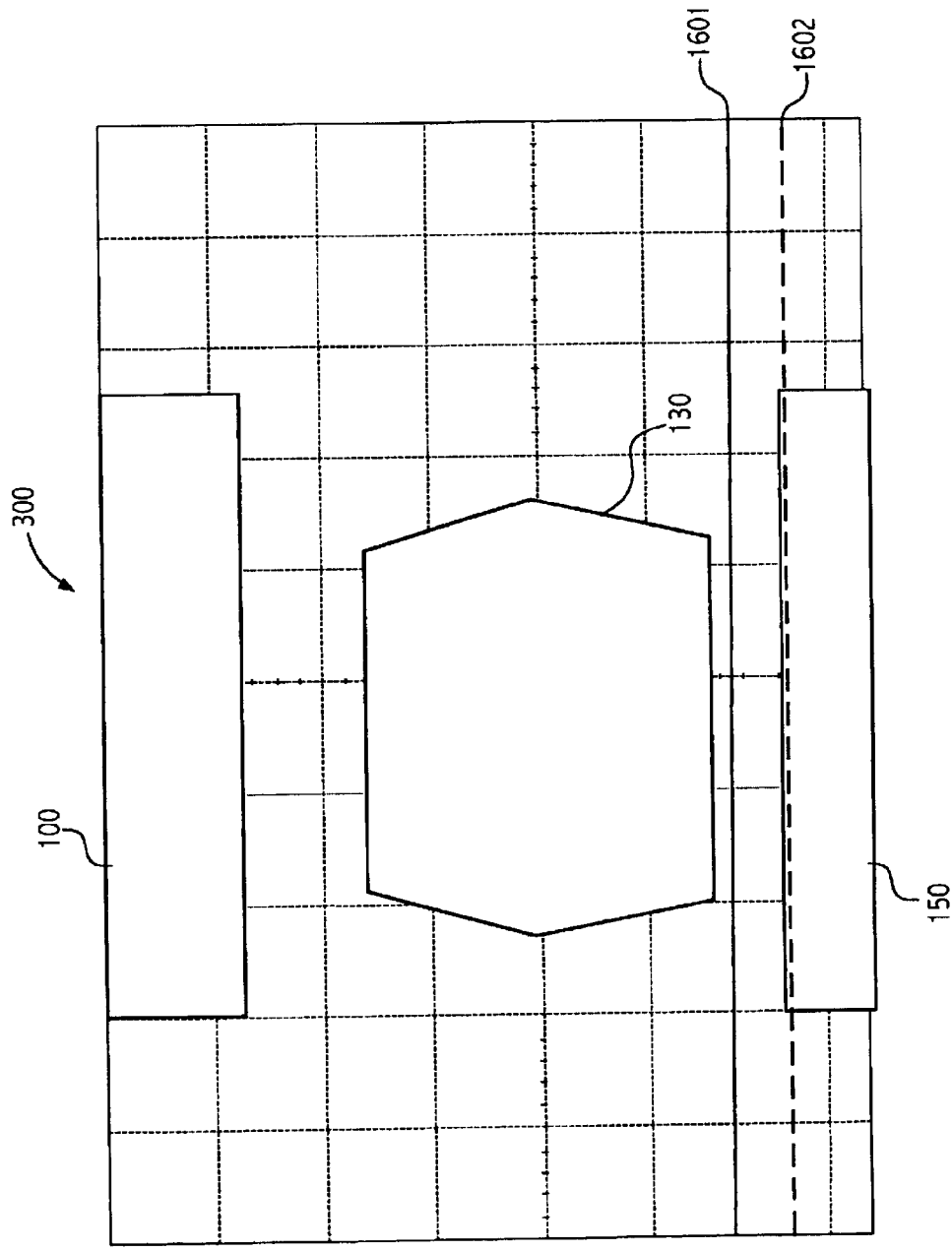
FIG. 16 shows an embodiment in accordance with the invention comprising a user interface for modifying the undershoot parameter of an NRZ mask template.

In accordance with an embodiment of the invention, FIG. 16 shows adjustment of undershoot parameter 180 for NRZ template mask 300. Position marker 1601 is aligned with the logic 0 level as shown in FIG. 16 and serves as a fixed reference during adjustment of undershoot 180. To change undershoot 180, position marker 1602 is displaced a distance equal to the desired new undershoot 180 with respect to position marker 1601. After movement of position marker 1602, NRZ template mask 300 is recalculated and redrawn to reflect the change in undershoot 180. The minimum allowed value for undershoot parameter 180 is 0 and the maximum is −Min_y.

Figure 17:
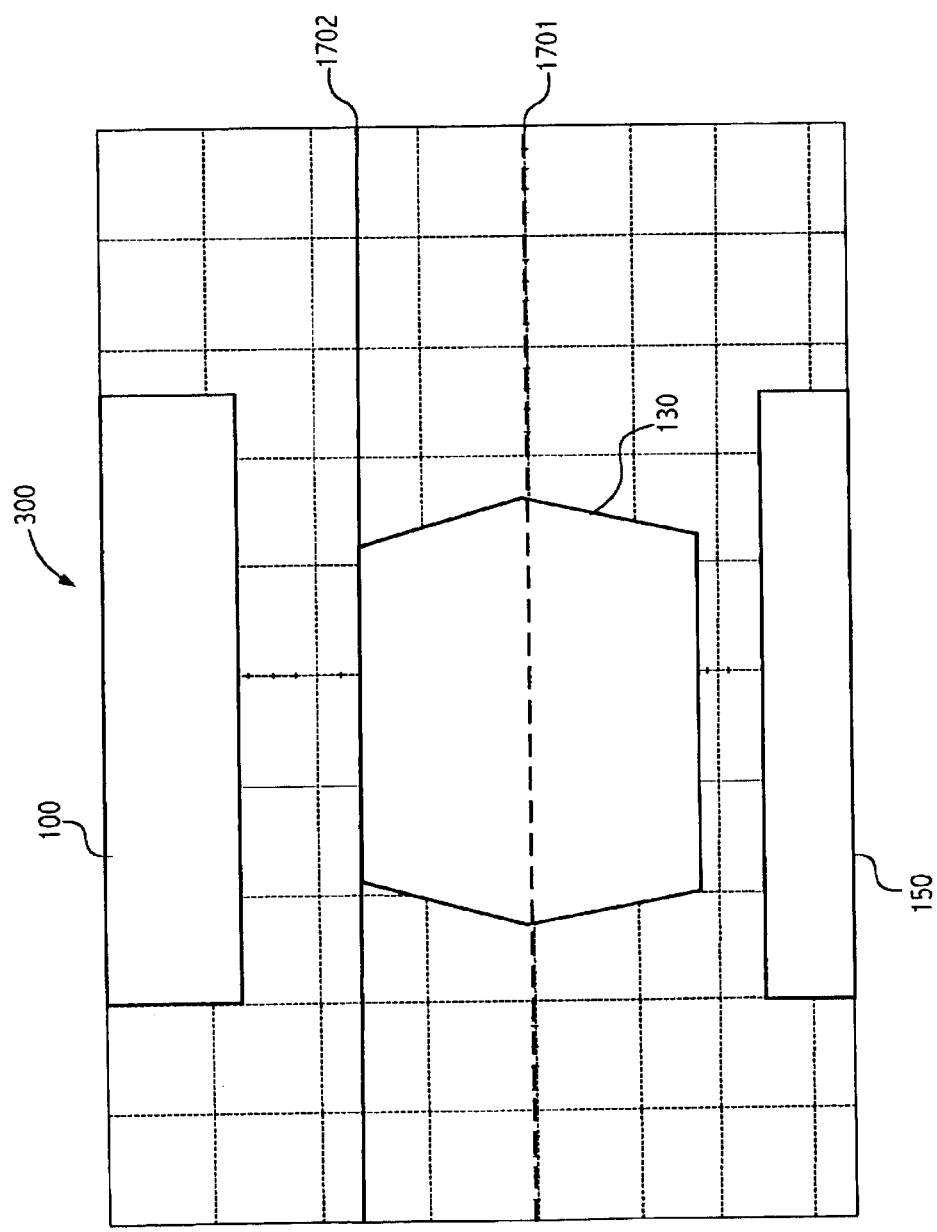
FIG. 17 shows an embodiment in accordance with the invention comprising a user interface for modifying the eye height parameter of an NRZ mask template.

In accordance with an embodiment of the invention, FIG. 17 shows adjustment of eye height parameter 140 for NRZ template mask 300. Position marker 1701 is aligned the middle of polygon 130 as shown in FIG. 17 and serves as a fixed reference during adjustment of eye height parameter 140. To change eye height parameter 140, position marker 1702 is displaced a distance equal to half the desired new eye height parameter 140 with respect to position marker 1701. After movement of position marker 1702, NRZ template mask 300 is recalculated and redrawn to reflect the change in eye height parameter 140. The minimum allowed value for eye height parameter 140 is 0 and the maximum allowed value is 1.

Figure 18:
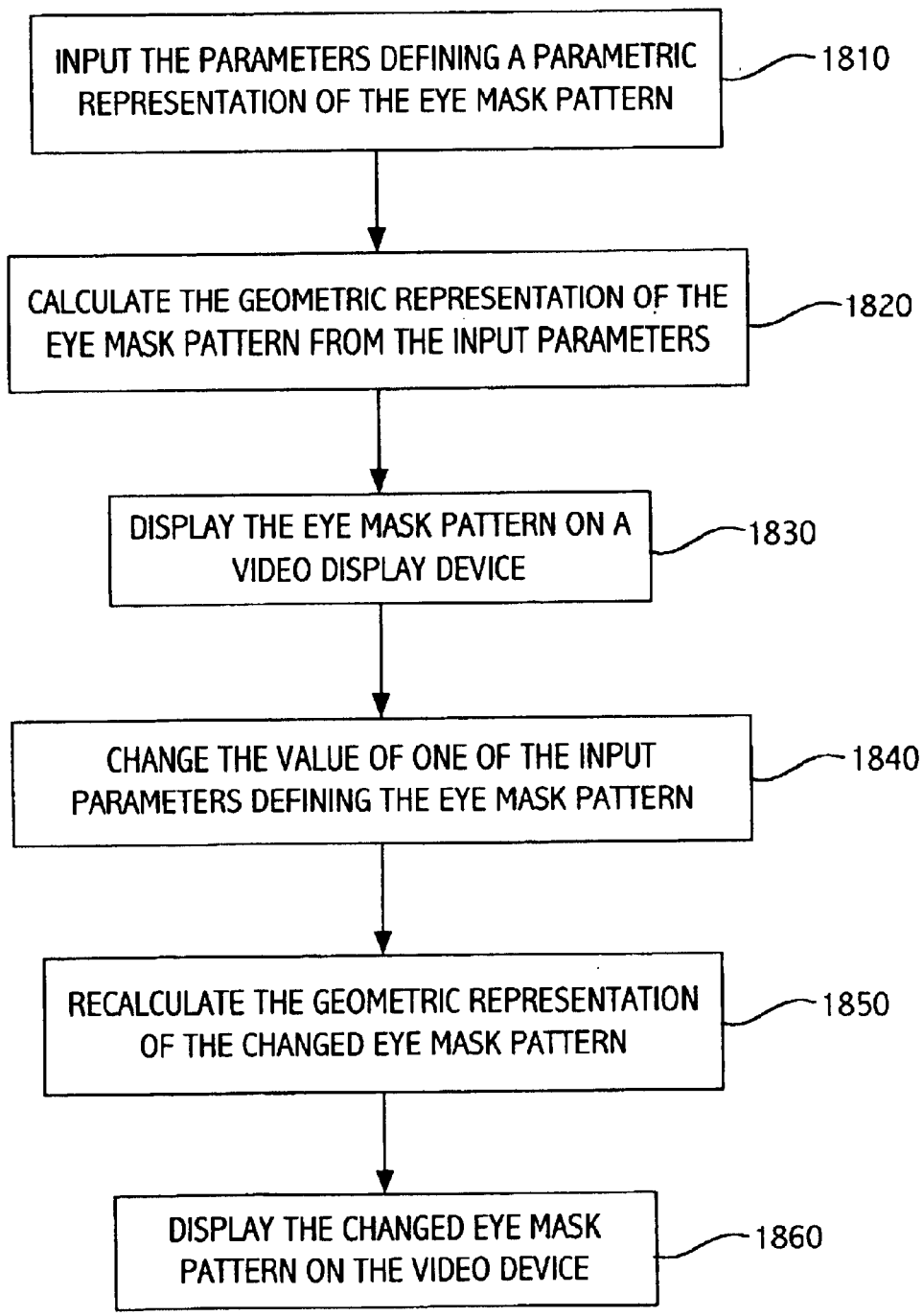
FIG. 18 shows an embodiment in accordance with the invention showing steps for modifying an eye mask.

An embodiment in accordance with the invention is described in FIG. 18. Step 1810 involves inputting the parameters for the parametric representation of a previously defined eye mask onto a personal computer or digital oscilloscope, from a file on a data storage device to allow interactive creation of a desired custom eye mask pattern. Typically, the parameter set for eye mask template 300 or 400 or a custom eye mask, such as custom eye mask 199 or 299, is loaded onto the personal computer or digital oscilloscope from a file and the file additionally specifies whether the parameter set belongs to an NRZ type mask or an RZ type mask. Additionally, for the RZ case there is an indication provided in the file as to whether the RZ mask type is polygonal, Gaussian or some other functional type. If the previously defined eye mask is NRZ eye mask template 300 or a custom NRZ eye mask such as custom eye mask 199 (see FIG. 1), the input parameter set is jitter parameter 110, rise/fall time parameter 120, eye height parameter 140, undershoot parameter 180 and over shoot parameter 160. If the previously defined eye mask is RZ eye mask template 400 or a custom RZ eye mask such as custom eye mask 299 (see FIG. 2), the input parameter set is jitter parameter 210, pulse width parameter 270, rise/fall time slope parameter 220, eye height parameter 240, return-to-zero height parameter 280, undershoot parameter 260 and overshoot parameter 250. In step 1820, the geometric representation of the eye mask to be created is calculated from the input parameters.

For the NRZ case, using equations 1–14, the appropriate geometric representation is calculated from the parameters relevant to the NRZ parametric representation. For the RZ case, using equations 15–34, the appropriate geometric representation is calculated from the parameters relevant to the RZ parametric representation. In step 1830, previously defined NRZ eye mask template 300, RZ eye mask template 400 or previously a defined custom eye mask, such as custom eye mask 199 or 299 (see FIGS. 1 and 2, respectively) is displayed, typically on a computer monitor or a digital oscilloscope display. In step 1840, the value of a selected input parameter is adjusted to change eye mask template 400, eye mask template 300 or custom eye mask 199 or 299, typically as described in detail above with reference to FIGS. 6–17. Typically, for eye mask template 400, eye mask template 300 or custom eye mask 199 or 299, the selected input parameter is adjusted by the user with reference to a live or a stored input signal that produces an eye diagram on the video display, such as a signal from an optical transmitter. In step 1850, the geometric representation of either eye mask template 400 or eye mask template 300 is recalculated to reflect the change in the selected input parameter as described above. Finally, in step 1850, the modified eye diagram is redrawn on the computer monitor or digital oscilloscope display using the modified geometric representation derived from the modified parametric representation. The process is repeated for all NRZ or RZ parameters that the user wishes to modify interactively and may be iterated on a given parameter as well.

Figure 19:
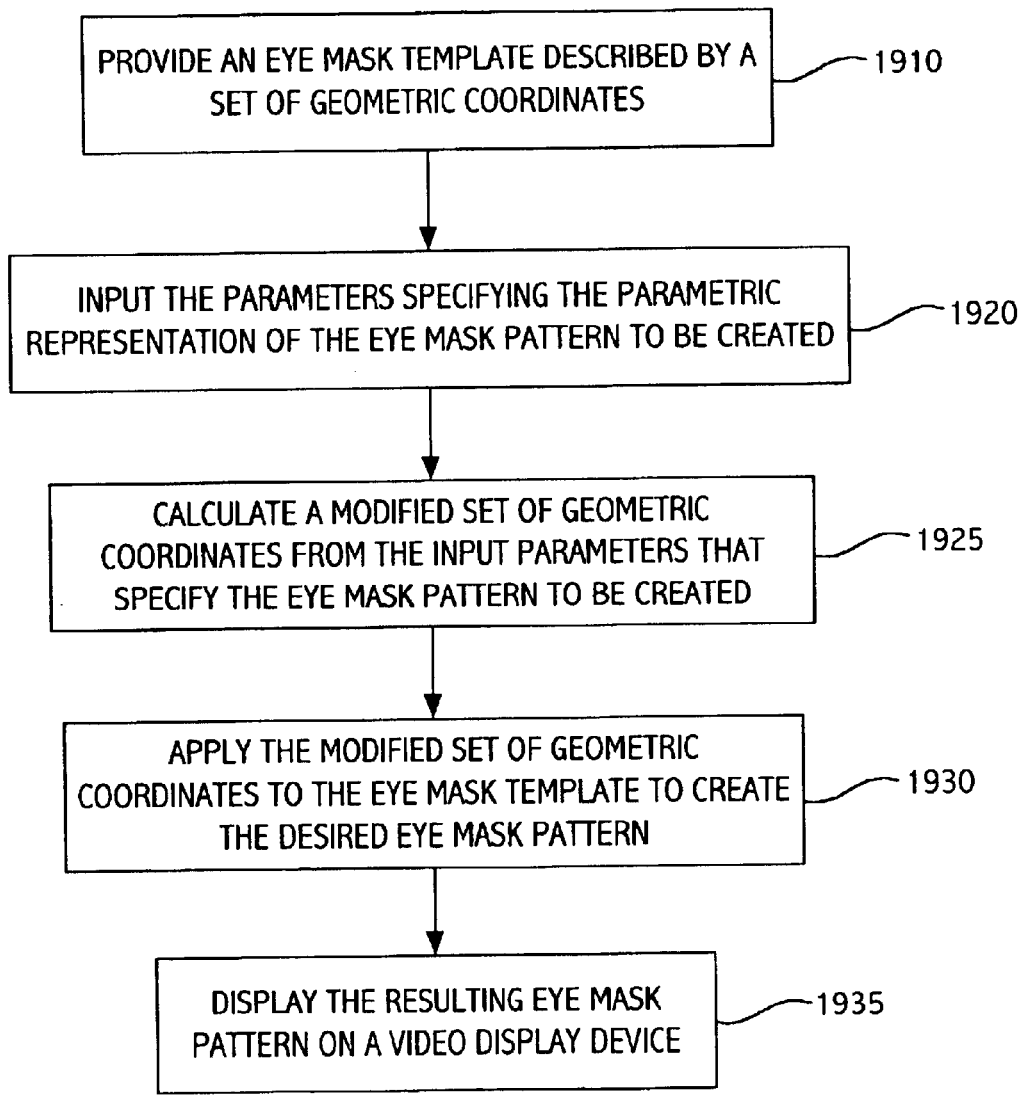
FIG. 19 shows an embodiment in accordance with the invention showing steps for creating a custom eye mask from a template.

An embodiment in accordance with the invention to make a custom eye mask from the appropriate eye mask template is described in FIG. 19. Step 1910 typically involves inputting the geometric coordinates, typically the vertices, of eye mask template 300 or 400 onto a personal computer, digital oscilloscope or other device having the appropriate computing means. Input of eye mask template 300 or 400 data is typically from a file on a data storage device. In step 1920, the parameters for the custom eye mask are input into the personal computer, digital oscilloscope or other device having the appropriate computing means. If the custom eye mask is an NRZ eye mask, the input parameters are jitter parameter 110, rise/fall time parameter 120, eye height parameter 140, undershoot parameter 180 and over shoot parameter 160. If the custom eye mask is an RZ eye mask 400, the input parameters are jitter parameter 210, pulse width parameter 270, rise/fall time slope parameter 220, eye height parameter 240, return-to-zero height parameter 280, undershoot parameter 260 and overshoot parameter 250. In step 1925, the set of geometric coordinates of the custom eye mask, typically the vertices of the component polygons 100, 130 and 150 for the NRZ case or the vertices of component polygons 200, 230 and 255 for the RZ case, are calculated from the set of input parameters to provide a geometric representation. For the NRZ case, using equations 1–14, the appropriate geometric coordinates for the desired custom eye mask such as, for example, custom eye mask 199 (see FIG. 1) are calculated from the eye mask parameters relevant to the NRZ parametric representation. For the RZ case, using equations 15–34, the appropriate geometric coordinates for the desired custom eye mask such as, for example, custom eye mask 299 (see FIG. 2) are calculated from the eye mask parameters relevant to the RZ parametric representation. In step 1930, the geometric coordinates of custom eye mask 199 or 299 replace the geometric coordinates of eye mask template 300 or 400, respectively. Typically, the vertices of custom eye mask 199 or 299 are substituted for the vertices of eye mask template 300 or 400, respectively. In step 1935, the resulting custom eye mask such as custom eye mask 199 or 299 is displayed, typically on a computer monitor or a digital oscilloscope display.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

I claim:

1. A method for modifying an eye mask pattern on a video display device coupled to a central processing unit comprising:

providing a parametric representation of said eye mask pattern, said parametric representation comprising a plurality of adjustable physical parameters directly related to waveform parameters;

using said central processing unit to calculate a geometric representation of said eye mask pattern from said parametric representation;

displaying said geometric representation of said eye mask pattern on said video display device;

interactively inputting a changed value for one of said plurality of adjustable physical parameters of said parametric representation;

using said central processing unit to calculate a modified geometric representation from said changed value; and displaying said modified geometric representation of said eye mask pattern on said video display device.

2. The method of claim 1 wherein said one of said plurality of adjustable parameters is selected from a group consisting of a jitter parameter, an eye height parameter, a rise lime parameter, a fall time parameter, a pulse width parameter, a return to zero height parameter, an undershoot parameter and an overshoot parameter.

3. The method of claim 1 further comprising the step of displaying a sampled waveform generated by an optical transmitter together with said eye mask pattern.

4. The method of claim 1 wherein said eye mask pattern is a return to zero eye mask pattern.

5. The method of claim 1 wherein said video display device is an oscilloscope screen.

6. The method of claim 1 further comprising mapping said eye mask pattern onto an eye diagram.

7. The method of claim 6 wherein said eye diagram is generated from a live electromagnetic signal.

8. The method of claim 1 wherein said eye mask pattern is comprised of polygons.

9. The method of claim 8 wherein said geometric representation of said eye mask pattern comprises vertex coordinates of said polygons.

10. The method of claim 1 further comprising using a touch screen control on said video display device to interactively change one of said plurality of adjustable parameters of said parametric representation to modify said eye mask pattern.

11. A method for creating a custom eye mask pattern using a computer means comprising:

providing an eye mask template comprising a set of geometric coordinates on said computer means;

inputting into said computer means an eye mask parameter data set specifying said custom eye mask pattern, said eye mask parameter data set comprising a plurality of physical parameters directly related to waveform parameters;

calculating from said eye mask parameter data set by said computer means a modified set of geometric coordinates; and applying said modified set of geometric coordinates to said eye mask template to create said custom eye mask pattern.

12. The method of claim 11 wherein said eye mask pattern is a return to zero eye mask pattern.

13. The method of claim 12 wherein said eye mask parameter set comprises a height parameter, a return to zero height parameter, a jitter parameter, an eye height parameter, a rise time slope parameter, an undershoot parameter and an overshoot parameter.

14. The method of claim 11 wherein said custom eye mask pattern comprises a plurality of component regions.

15. The method of claim 14 wherein said plurality of component regions are polygons.

16. The method of claim 11 further comprising the step of storing said set of coordinates on a data storage device.

17. The method of claim 14 wherein one of said component regions is comprised of a boundary having a substantially Gaussian shape.

18. The method of claim 15 wherein the number of said polygons is three.

19. A method for creating an eye mask pattern using a computer means coupled to a video display device comprising:

providing an eye mask template comprising a set of geometric coordinates on said computer means;

inputting into said computer means an eye mask parameter data set specifying said eye mask pattern, said eye mask parameter data set comprising a plurality of physical parameters directly related to waveform parameters;

calculating from said eye mask parameter data set by said computer means a modified set of geometric coordinates;

applying said modified set of geometric coordinates to said eye mask template to create said eye mask pattern; and displaying said eye mask pattern on said video display device.

20. The method of claim 19 wherein said video display device is an oscilloscope screen.

* * * * *